United States Patent Office 3,056,838
Patented Oct. 2, 1962

3,056,838
9α-HYDROXY-A-NORPROGESTERONE
Frank L. Weisenborn, Middlebush, and Charles John Sih, New Brunswick, N.J., assignors to Olin Mathieson Chemical Corporation, New York, N.Y., a corporation of Virginia
No Drawing. Filed Dec. 29, 1959, Ser. No. 862,453
1 Claim. (Cl. 260—586)

This invention relates to, and has for its object, the provision of the compound 9α-hydroxy-A-norprogesterone having the formula:

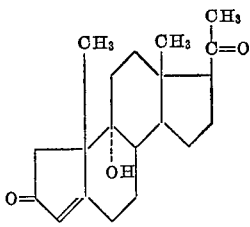

In accordance with the method of this invention, 9α-hydroxy-A-norprogesterone is prepared by subjecting A-nor-progesterone to the action of enzymes of the microorganism *Nocardia restrictus* under oxidizing conditions. The hydroxylation can be best effected by either including the steroid in an aerobic culture of *Nocardia restrictus* or by bringing together in an aqueous medium, the steroid, air and enzymes of non-proliferating cells of the microorganism.

In general, the conditions for culturing *N. restrictus* for the purposes of this invention are (except for the inclusion of the steroid to be converted) the same as those for culturing various other molds for the production of antibiotics, i.e., the microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin), a fatty acid, a fat and/or the steroid to be converted. Preferably, however, the medium includes an assimilable source of carbon and energy in addition to the steroid.

The source of nitrogenous factors may be natural (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile air supply should be maintained during fermentation, for example by the conventional methods of exposing a large surface of the medium to air or by utilizing submerged aerated culture techniques. The steroid may be added to the culture during the incubation period, or included in the medium prior to sterilization or inoculation. The preferred range of concentration of the steroid in the culture is about 0.01 to 0.1%. The culture period may vary considerably, the range of about six to ninety-six hours being feasible but not limiting.

The process yields 9α-hydroxy-A-norprogesterone, the compound of this invention. 9α-hydroxy-A-norprogesterone is a pharmacologically active compound having anti-androgenic activity. Thus, the compound of this invention can be administered in the treatment of hyperandrogenic acne, i.e., the acne condition resulting from the overabundance of an androgen such as testosterone. It may be administered for this purpose either topically or systemically (e.g., subcutaneously) being formulated for such administration in conventional ointments or injectable liquid carriers.

The following example is presented to more fully illustrate the present invention:

Example

Surface growth from a two-week old culture of *Nocardia restrictus* (Waksman Collection No. 545, Rutgers University, New Brunswick, New Jersey) grown on agar is suspended in 5 ml. of an 0.85% saline solution. One ml. portions of this suspension are used to inoculate 500 ml. flasks containing 100 ml. of a medium of the following composition:

|  | Gms. |
|---|---|
| Dextrose | 10 |
| Yeast extract | 2.5 |
| Corn steep liquor | 6 |
| $NH_4H_2PO_4$ | 3 |
| $CaCO_3$ | 2.5 |
| Soybean oil | 2.2 |
| Distilled water, q.s., 1 liter. | |

The inoculated flasks are incubated at 25° C. on a rotary shaker (280 cycles per minute; 2 inch radius) for 24 hours, after which time, 5% by volume transfers of the contents of each flask are made to each of twenty 500 ml. flasks containing 100 ml. of the same medium. To these flasks is then added 0.25 ml. of a dimethylformamide solution of A-norprogesterone having a concentration of 120 mg./ml. of steroid. The concentration of the steroid in the medium is 300 gamma of steroid/ml. of medium. The steroid-containing medium is fermented at 25° C. on a rotary shaker (280 cycles per minute; 2 inch radius).

After 7 hours of fermentation under these conditions, the culture broths from each flask are harvested by vacuum filtration directly through a Seitz clarifying pad. The combined filtrate, amounting to 2570 ml. of material, is extracted three times with 700 ml. portions of chloroform. The combined chloroform extracts are washed with water, saturated with sodium chloride, dried over sodium sulfate and evaporated to dryness under vacuum. The residue, weighing about 236 mgs. is chromatographed on 25 gms. of neutral alumina. The column is eluted with a mixture of chloroform and benzene using increasing concentrations of chloroform in benzene. The combined eluates are dried to yield a residue which is recrystallized from ethyl acetate-hexane to give about 35 mg. of crystalline 9α-hydroxy-A-norprogesterone having the following properties: M.P. about 227–229° C.; $[\alpha]^D$ +94° (chloroform);

$$\lambda^{alc.}_{max.}\ 234\ m\mu\ (\log\ \epsilon\ 4.14)$$

The invention may be variously embodied within the scope of the appended claim.

What is claimed is:
9α-hydroxy-A-norprogesterone.

References Cited in the file of this patent
UNITED STATES PATENTS

| 2,810,758 | Johnson et al. | Oct. 22, 1957 |
| 2,832,805 | Hoehn et al. | Apr. 29, 1958 |
| 2,840,578 | Perlman et al. | June 24, 1958 |
| 2,863,806 | Dulaney et al. | Dec. 9, 1958 |
| 2,872,381 | Fried et al. | Feb. 3, 1959 |